United States Patent [19]
Kubo et al.
[11] 3,717,856
[45] Feb. 20, 1973

[54] DUAL HEADS WITH SELECTIVE DATA DEPENDENT ENERGIZATION

[75] Inventors: Moritada Kubo, Yasuo Shinomiya, both of Tokyo, Japan

[73] Assignee: Tokyo Shibaura Electric Co., Ltd., Hawasaki-shi, Japan

[22] Filed: Dec. 30, 1971

[21] Appl. No.: 214,270

[30] Foreign Application Priority Data

Dec. 30, 1970 Japan ..............................45/122953

[52] U.S. Cl. ........................340/174.1 G, 340/174.11
[51] Int. Cl. ..............................................G11b 5/02
[58] Field of Search .340/174.1 A, 174.1 G, 174.1 H; 179/100.2 MD

[56] References Cited

UNITED STATES PATENTS

| | | | |
|---|---|---|---|
| 3,665,430 | 5/1972 | Hinrichs | 340/174.1 G |
| 3,320,598 | 5/1967 | Star | 340/174.1 G |
| 3,562,726 | 2/1971 | Hamilton | 340/174.1 G |
| 3,665,118 | 5/1972 | Cooper, Jr. | 179/100.2 S |

Primary Examiner—Vincent P. Canney
Attorney—Solon B. Kemon et al.

[57] ABSTRACT

Magnetic tape memory apparatus consisting of a writing unit and a reading unit, the writing unit comprising a magnetic tape feeding device, a first and a second writing magnetic heads which are juxtaposed along the travelling direction of the magnetic tape in such a manner that the directions of magnetization thereof intersect substantially orthogonally to each other, and a logical circuit which effects change-over such that data are fed to the first magnetic head when each bit level of a plurality of bits constituting an address at each predetermined bit is "1" and that they are fed to the sevond magnetic head when it is "0," the reading unit comprising the first and second reading magnetic heads which individually read information stored on the magnetic tape by the first and second writing magnetic heads, means to combine outputs from the first and second reading magnetic heads and to thereby reproduce the data, and means to compare an output from the first magnetic head of the reading unit and an information representative of an aimed address and to lower the travelling speed of the magnetic tape when the two outputs are coincident.

8 Claims, 15 Drawing Figures

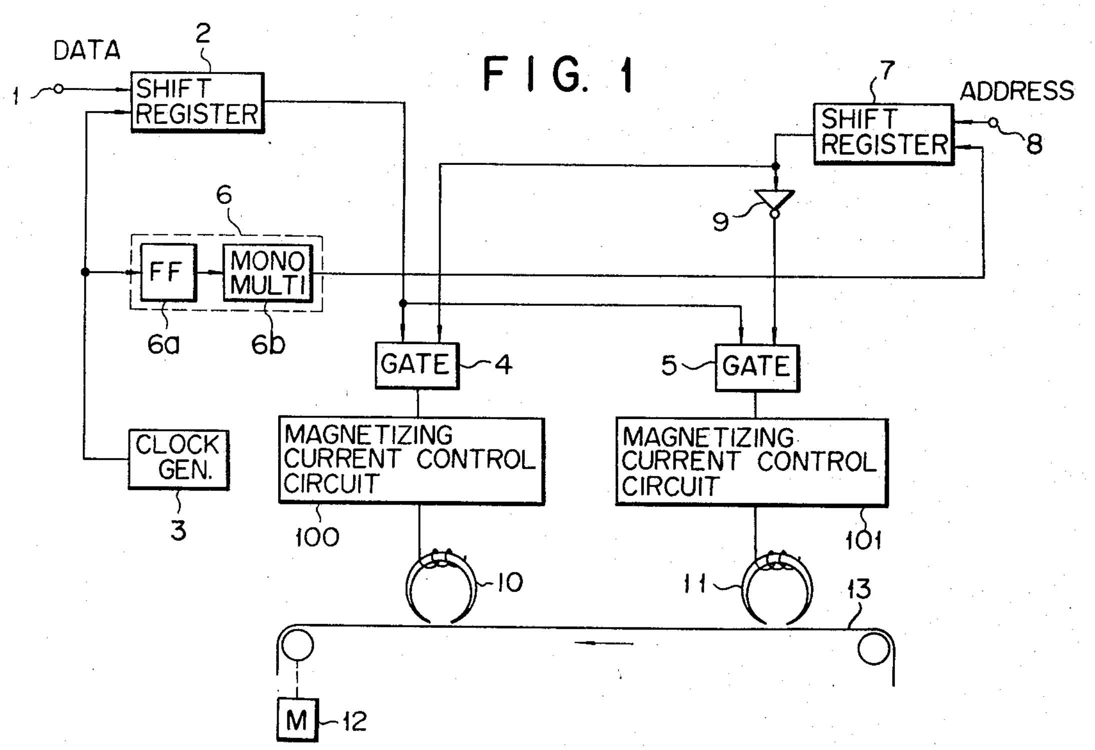
FIG. 1
FIG. 2
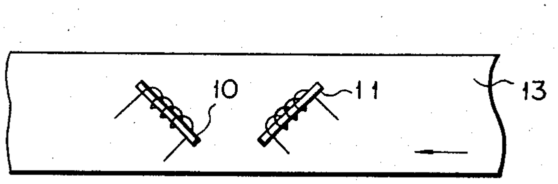
FIG. 3
| DATA CODE | A | | | | B | | | | C | | | |
|---|---|---|---|---|---|---|---|---|---|---|---|---|
| CONTENTS | 1 | 1 | 0 | 1 | 1 | 0 | 1 | 1 | 1 | 0 | 1 | 0 |
| ADDRESS | B DATA ADDRESS | | | | C DATA ADDRESS | | | | D DATA ADDRESS | | | |
| | 1 | | 1 | | 1 | | 0 | | 0 | | 1 | |
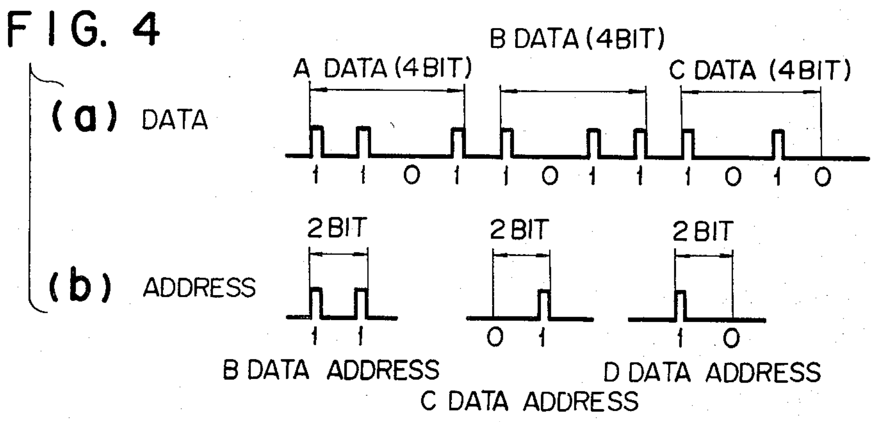
FIG. 4

| DATA CODE | A | B | C | D | |
|---|---|---|---|---|---|
| CONTENTS | 1 0 0 0 0 | 1 1 0 0 0 | 1 1 1 0 0 | 1 1 1 1 0 | |
| ADDRESS | D DATA ADDRESS: 1 1 0 | | | F DATA ADDRESS: 0 1 | |

| DATA CODE | A | | | | B | | | | C | | | | |
|---|---|---|---|---|---|---|---|---|---|---|---|---|---|
| CONTENTS | 1 | 0 | 1 | 1 | 1 | 1 | 0 | 1 | 1 | 0 | 1 | 0 | |
| ADDRESS | B DATA ADDRESS | | | | C DATA ADDRESS | | | | D DATA ADDRESS | | | | |
| | 0 | 0 | 1 | 1 | 1 | 0 | 1 | 1 | 0 | 1 | 1 | 0 | |

DUAL HEADS WITH SELECTIVE DATA DEPENDENT ENERGIZATION

BACKGROUND OF THE INVENTION

This invention relates to sequential access memory apparatus, and more particularly to improvements in magnetic tape memory apparatus.

The magnetic tape memories are disadvantageous in, e.g., that since the travelling speed of the magnetic tape is constant, the access time of the magnetic tape memory apparatus is very long, and that since individual data and address information corresponding to the data are sequentially recorded on a magnetic tape, the efficiency of use of the tape is poor.

SUMMARY OF THE INVENTION

It is accordingly an object of this invention to provide magnetic tape memory apparatus which is short in access time and which may enhance the efficiency of use of the tape.

According to this invention, there is provided a magnetic memory apparatus composed of a writing unit and a reading unit; said writing unit comprising a magnetic tape feeding device, first and second writing magnetic heads which are juxtaposed along the travelling direction of a magnetic tape so that the directions of magnetization thereof may intersect each other, and a switching logic circuit which feeds data to said first writing magnetic head when each bit level of a plurality of bits constituting an address is "1" and to said second writing magnetic head when it is "0" and which thereby stores them on said magnetic tape; said reading unit comprising first and second reading magnetic heads which individually read the information stored on said magnetic tape, means to combine outputs from said first and second reading magnetic heads to thereby reproduce said data, and means to compare an output from said first magnetic head of said reading unit and an information representative of an aimed address in order to lower the travelling speed of said magnetic tape when both the outputs coincide.

BRIEF DESCRIPTION OF THE DRAWINGS

FIG. 1 is a diagram of circuit arrangement showing a writing unit in magnetic tape memory apparatus embodying this invention;

FIG. 2 is a diagram showing the arrangement relation between two writing magnetic heads in FIG. 1;

FIG. 3 is a diagram for illustrating the relation between the data contents and address signals stored on the magnetic tape in accordance with this invention;

FIG. 4 is an example of pulse wave-form diagram showing the relation between the data contents and address signals;

DETAILED DESCRIPTION OF THE INVENTION

Figures 5, 6:
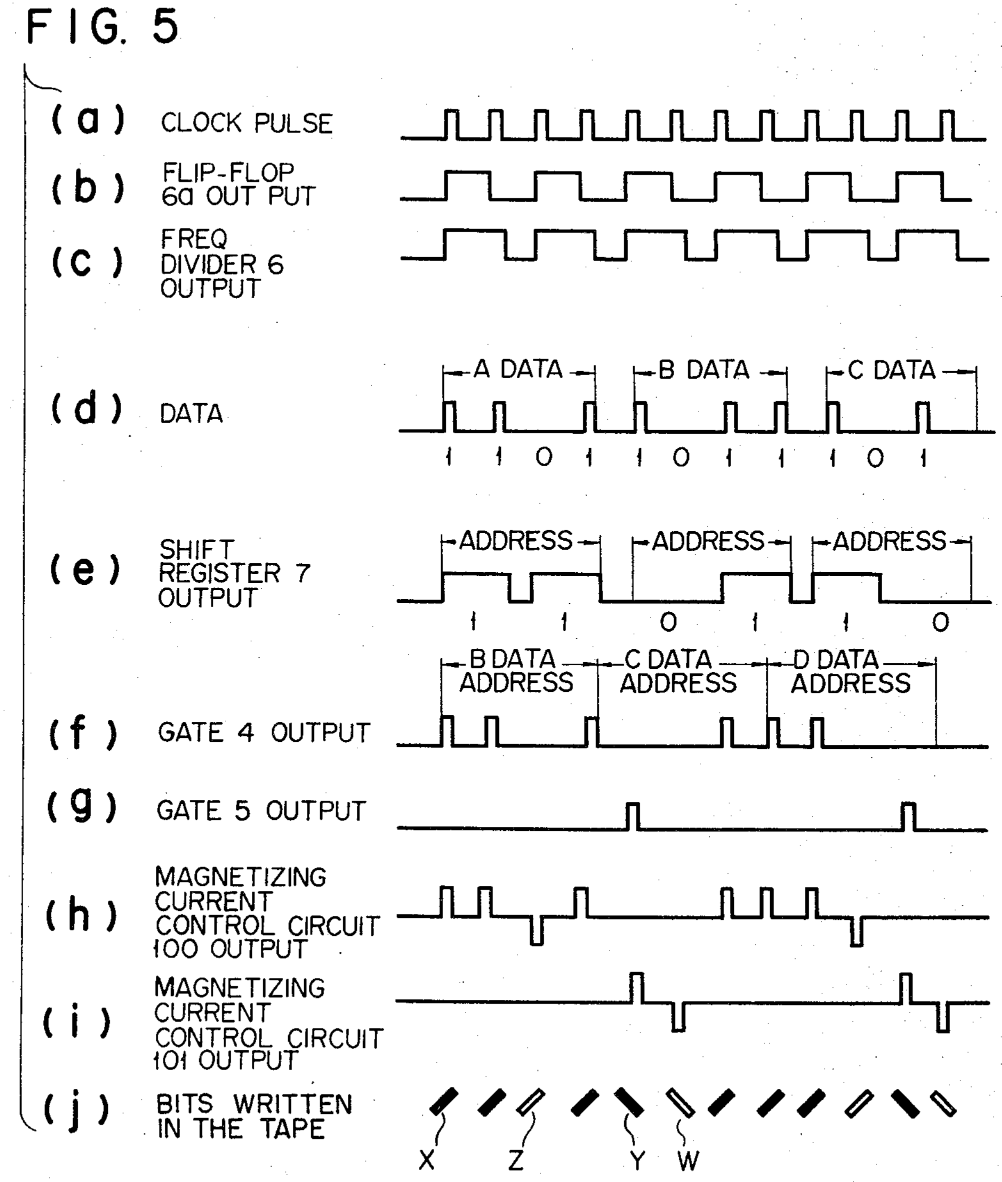
FIG. 5 is a wave-form diagram for illustrating the operations of the writing unit shown in FIG. 1.
FIG. 6 is a further example of diagram showing the relation between the data contents and address signals.

Referring to FIG. 1, data contents supplied to a data input terminal 1 are applied to the input terminal of the first shift register 2. Clock pulses from a clock generator 3 are applied to the clock input terminal of the first shift register 2, and the data contents are successively fed from the shift register 2 to one of input terminals of each of the first and second gates 4 and 5 by the clock pulses. The output of the clock generator 3 is also supplied to a frequency divider 6 being constituted by a flip-flop 6a and a monostable multivibrator 6b and having a frequency division ratio of 2, and has its frequency divided into a half. The pulse width of the divided half frequency signal is wider than that of the clock pulse and is supplied to the clock input terminal of the second shift register 7. To the signal input terminal of the shift register 7, an address signal representing the address of the data being supplied to the input terminal 1 is supplied from an address input terminal 8. Each time the pulse output is provided from the frequency divider 6, the address signal is supplied to the other input terminal of the first gate 4 directly and to the other input terminal of the second gate 5 through an inverter 9. Gates 4 and 5 are opened to pass the data contents only when "1" signals are supplied to each of the other input terminals of the gates 4 and 5. The outputs of the gates 4 and 5 are fed to magnetizing current control circuits 100 and 101, respectively. The magnetizing current control signal circuits 100 and 101 are constructed to flow unidirectional magnetizing current to magnetic head 10 or 11 when the data contents are "1," and reversed magnetizing currents when the data contents are "0." Data contents are respectively written by means of the head 10 or 11 on a magnetic tape 13 which is extended between reels driven by a motor 12 and which is travelling in the direction of arrow. As shown in FIG. 2, the first and second writing magnetic heads 10 and 11 are juxtaposed along the travelling direction of the magnetic tape 13 such that the directions of magnetization thereof are, for example, orthogonal to each other.

FIG. 3 shows a pattern of data having a small number of bits for better understanding of this invention, though the data included in a memory apparatus in actual use may have a far larger number of bits. However, the theory of this invention may be distinctly understood from FIG. 3 all the same. There will now be described by reference to FIG. 3 the condition in which each data is provided with an address. Further, FIG. 3 represents the case where the ratio of frequency division is set at ½ as in FIG. 1. Each data is formed of, for example, four bits. Namely, the contents of the data A have four bits of "1 – 1 – 0 – 1;" the contents of the data B have four bits of "1 – O – 1 – 1;" and the contents of the data C have four bits of "1 – O – 1 – 0." Though, practically, there may, of course, follow the data D, E, F . . . in turn, description thereof is omitted. Each data address consists of, for example, two bits. Thus, the bits "1 – 1" of the data B address are written in the tape 13 together with these of the data A; the bits "1 – 0" of the C data address are stored therein jointly with those of the data B; and the bits of the data D address are written therein with those of the data C. According to this invention, the first data, that is, the data A is not provided with an address. The reason is that the first data is located at the forward end of the tape 13, showing its position distinctly. Since, as apparent from FIG. 3, the ratio of frequency division is ½, one bit of the address corresponds to two bits of the contents of each data.

FIG. 4 refers to the case where the contents and address of each data shown in FIG. 3 are represented by pulse signals. As seen from FIG. 4, there is generated a signal at "1" but no signal at "0."

There will now be described by reference to FIGS. 1, 2, 3, 4 and 5, the operation of writing information in the tape 13. When the clock pulses of FIG. 5(*a*) are supplied to the shift register 2, the contents of the data A, B, C . . . successively appear, as shown in FIG. 5(*d*), at the output terminal of the shift register 2 to be conducted to the gates 4 and 5. The aforesaid clock pulses are supplied to the flip-flop circuit 6*a* of the frequency divider 6 to have the frequency reduced by half as illustrated in FIG. 5(*b*). The pulse whose frequency has thus been reduced by half is conducted to the monostable multivibrator 6*b*, whose time constant is preset so as to generate pulses having a width equal to the period in which there are generated two clock pulses. An output pulse from the frequency divider 6, therefore, has the wave form shown in FIG. 5(*c*). When said output from the frequency divider 6 is supplied to the shift register 7, the addresses of the data B, C, D . . . previously stored in said shift register 7 are successively brought to its output terminal. The address pulses and the pulses indicating the contents of each data have such relationship that one bit of the former corresponds to two bits of the latter (FIG. 3). Output (FIG. 5(*e*)) from the shift register 7 is supplied to the gates 4 and 5. Since these gates 4 and 5 are also supplied with output from the shift register 2, output from the gate 4 takes the form indicated in FIG. 5(*f*) and that from the gate 5 presents the form shown in FIG. 5(*g*). Namely, when the bit of the address denotes "1" the gate 4 is opened, while, when said bit represents "0,38 the gate 5 is opened by the action of the inverter 9. Outputs from the gates 4 and 5 are supplied to a magnetizing current control circuit 100 or 101 to check at the same timing as the clock pulse whether the data contents are "1" or "0." Said magnetizing current is supplied to the magnetic head 10 or 11 in accordance with "1" or "0" signal (FIGS. 12(*h*) and 12(*i*)). Output from said magnetizing current control circuit 100 or 101 is conducted to the magnetic head 10 or 11 to be written in the tape 13 in the form shown in FIG. 12(*j*). As seen from FIG. 5(*j*), the data contents recorded in the tape 13 by the magnetic head 10 are expressed by bits X and Z (X represents "1" and Z "0") and the data contents stored in the tape 13 by the magnetic head 11 are denoted by Y and W (Y shows "1" and W "0"). The data contents written in the tape 13 by the magnetic heads 10 and 11 are magnetized in the directions mutually defining an angle of substantially 90°. Therefore, the data contents written by the magnetic head 10 are prevented from being read out by the magnetic head 11. Similarly, the data contents written by the magnetic head 11 can not be drawn out by the magnetic head 10.

As mentioned above, this invention causes the data addresses to be indicated by the direction in which there are magnetized the bits of the data contents.

While, in the above description, the clock pulse frequencies have been divided by two by means of the frequency divider 6 relative to the four bits of data to thereby bring said data into correspondence with the two bits of address signal, it is also allowed that, as shown in FIG. 6 the contents of five bits data A, B, C, D . . . are brought into correspondence with three bits of addresses. In this case, the ratio of the frequency division of the clock pulses by the frequency divider 6 is ⅓, and hence, one bit of the address signal corresponds to three bits of the data content as illustrated in FIG. 6. Ultimately, three bits of the address correspond to nine bits which extend over, e.g., the data A and B. The address of the data D in FIG. 6 is stored, in acutality, at that position on the magnetic tape which corresponds to the preceding data A and B.

Figures 7, 8:
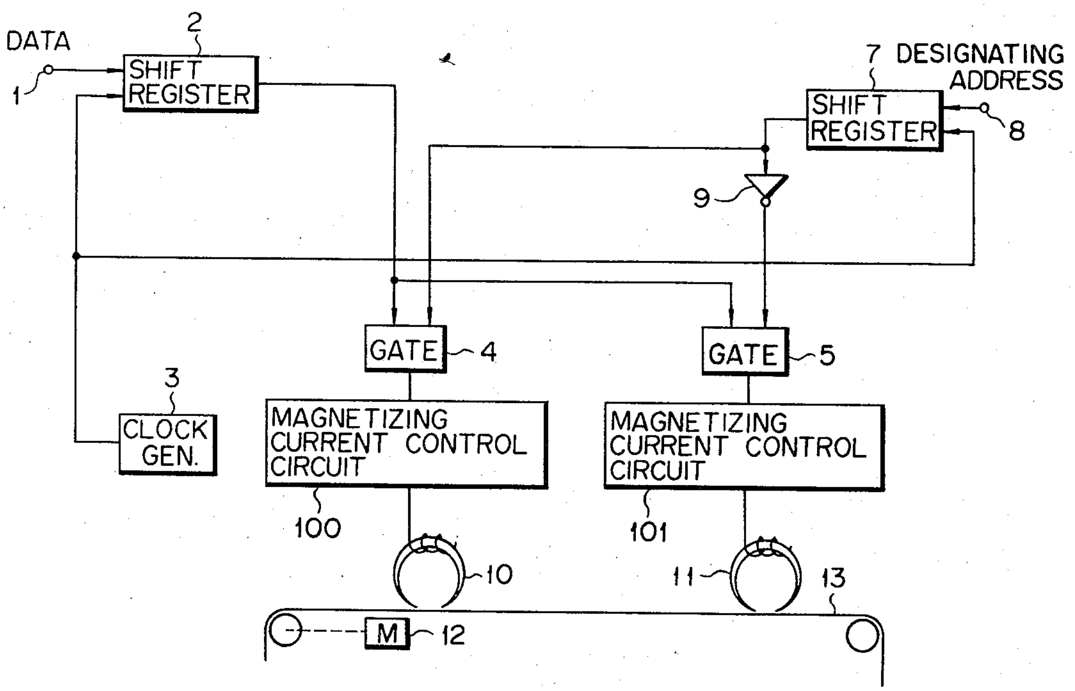
FIG. 7 is a diagram of circuit arrangement showing another embodiment of the writing unit according to this invention.
FIG. 8 is a further example of diagram showing the relation between the data contents and address signals.

FIG. 7 shows an embodiment of the writing unit in a case where the data and the address are made up of the same number of bits. Since the embodiment is of the same construction as the previous one in FIG. 1 except the omission of the frequency divider 6, the same reference numerals are assigned.

FIG. 8 illustrates the contents and address of each data written in the tape 13 by the circuit of FIG. 7. As seen from FIG. 8, one bit of the data address corresponds to one bit of the data contents.

Figure 9:
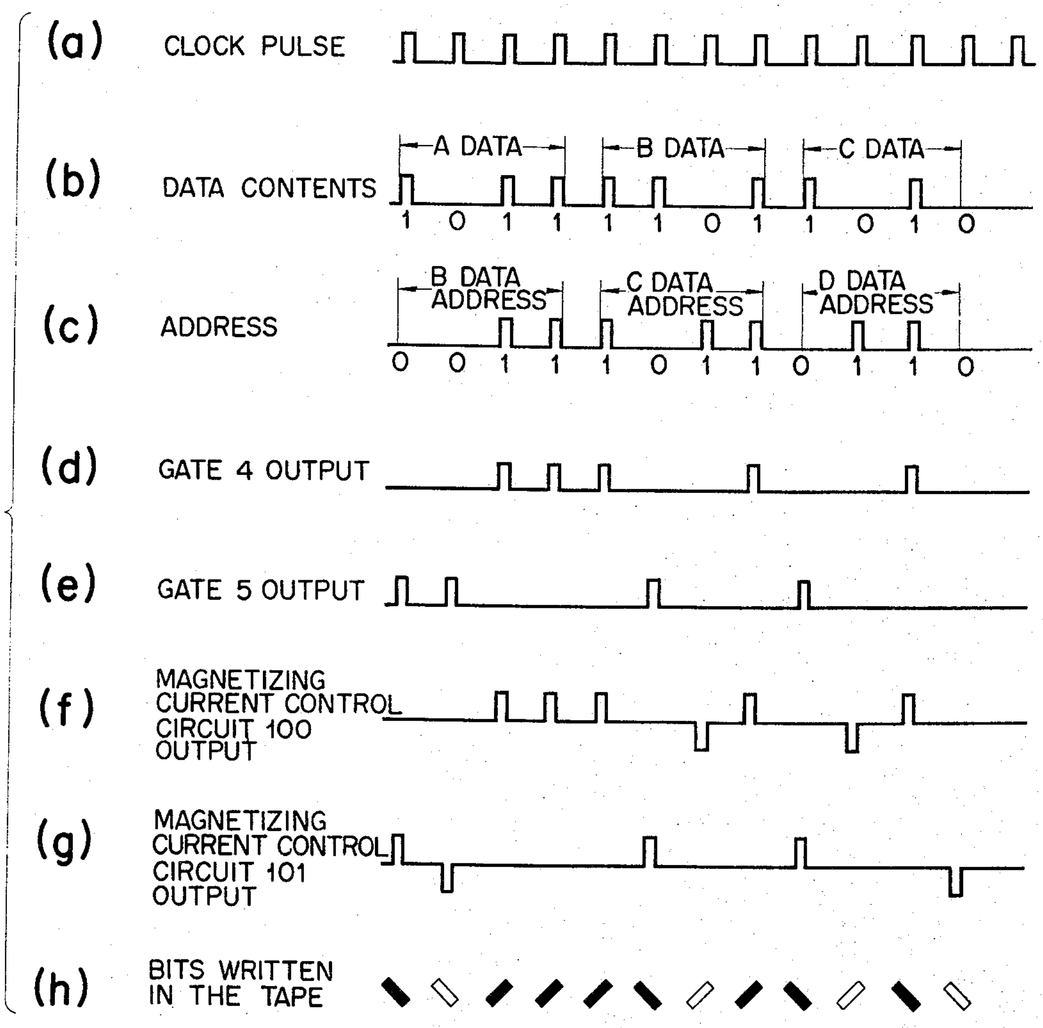
FIG. 9 is a wave-form diagram for explaining the operations of the writing unit shown in FIG. 7.

There will now be described by reference to FIGS. 8 and 9 the writing operation of FIG. 7. When output (FIG. 9(*a*)) from the clock pulse generator 3 is supplied to the shift registers 2 and 7, the bits of the contents of the data A, B, C . . . and the bits of the addresses thereof which are already stored in the shift registers 2 and 7 are conducted to the gates 4 and 5 (FIG. 9(*b*) and 9(*c*)). Accordingly, the output of the gate 4 becomes such a signal as shown in FIG. 9(*d*), while that of the gate 5 becomes as shown in FIG. 9(*e*). As a result, outputs from the magnetizing current control circuits 100 and 101 present the forms shown in FIGS. 9(*f*) and 9(*g*), and information stored on the magnetic tape 13 are as in FIG. 9(*f*) when shown by the same manner as in FIG. 4(*j*). When the bit level of the address is "1," data is stored by the head 10, while the data with the bit level "0" is stored by the head 11, the former and latter information differing in the direction of magnetization by approximately 90° from each other.

Figure 10:
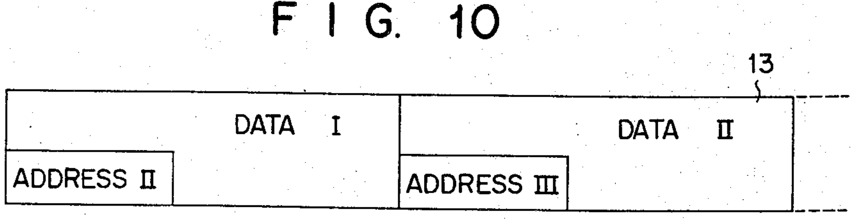
FIG. 10 is a diagram showing another example of the data contents and address signals stored on the magnetic tape.

With the writing unit in FIG. 7, it is not necessarily required that the data contents supplied to the terminal 1 have the same bits as the address as illustrated by way of the example in FIG. 8. In actuality, the number of bits of the data contents is sometimes much larger than that of bits of the address. The positional relation between the address and data stored on the magnetic tape 13 in this case is, for example, as illustrated in FIG. 10 in which as address is commonly stored at the front part of a data portion. Also in this case, address II corresponding to DATA II is included at the front part of the preceding DATA I. The explanation of the reason therefor will also be hereinbelow given with reference to FIG. 13.

Figure 11:
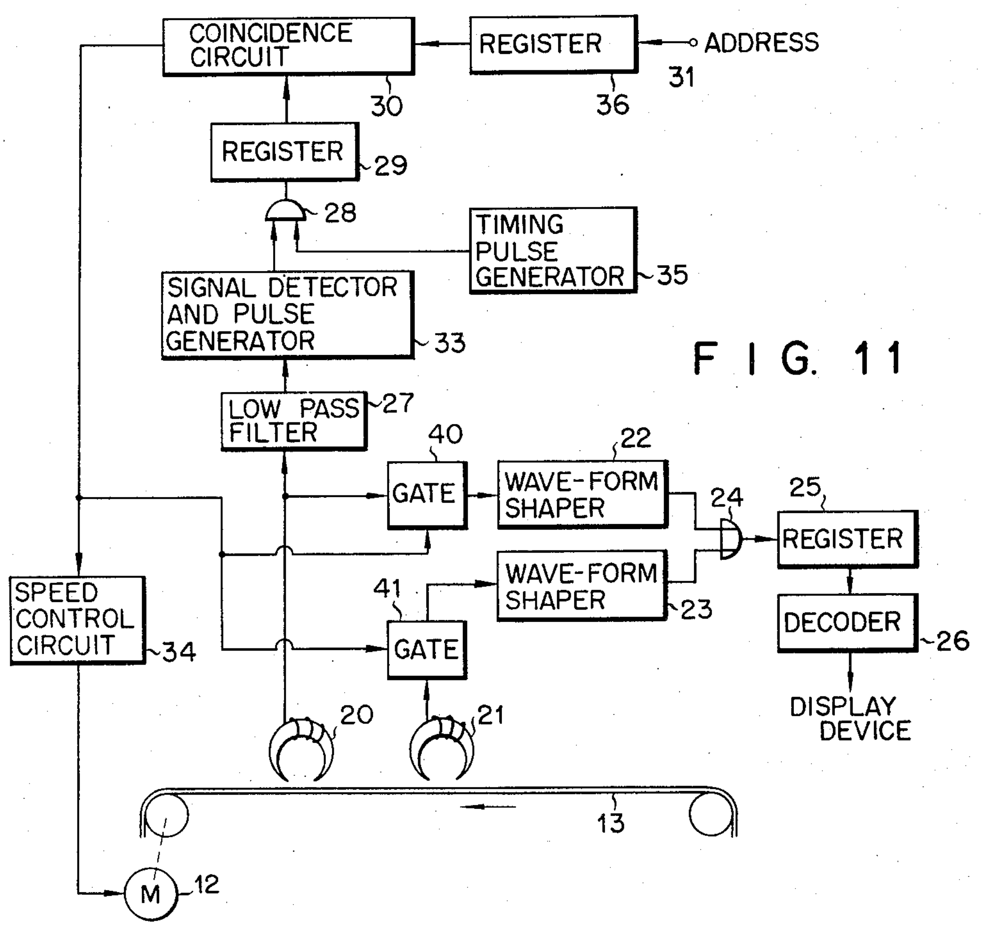
FIG. 11 is a diagram of circuit arrangement showing a reading unit in the magnetic tape memory apparatus embodying this invention.

In a reading unit in FIG. 11, the magnetic tape 13 on which the data and address are written by the aforementioned writing unit is extended over reels driven by a motor 12, and travels in the direction of arrow. The first and second reading magnetic heads 20 and 21 are juxtaposed along the travelling direction of the magnetic tape 13 in an arrangement relationship similar to that of the writing magnetic heads 10 and 11 shown in FIG. 2. As has been explained the reading magnetic head 20 detectes only the bits X, Z of the direction of the storage by the writing head 10 in FIG. 1, while the head 21 detects only the bits Y, W of the direction of the storage by the head 11.

The reason is that even when the bits X and Z written in the magnetic tape 13 are brought right below the reading magnetic head 21, the magnetic fluxes generated from said bits X and Z intersect said reading magnetic head 21 substantially at right angles and do not form a closed loop in said reading head 21. This holds true with the relationship between the bits Y and W versus the reading head 20. Therefore, the bits X and Z are detected from the reading head 20 and the bits Y and W from the reading head 21 and the respective output from reading head 20 and 21 are supplied to wave-form shapers 22 and 23 through gate 40 and 41, respectively.

When the magnetic tape 13 travels at a slow speed to read out data contents, said wave-form shapers 22 and 23 detect the positive or negative signals successively supplied from the reading head 20 or 21 and generate a signal of "1" when the detected signal is positive or a signal of "0" when the detected signal is negative, and supply said signal to the circuit 24. The output of the OR circuit 24 is supplied to a buffer register 25 to reproduce the contents of bits. The contents of bits are once stored in the buffer register 25, and thereafter it is decoded by, for example, a decoder 26 to be fed to a display device (not shown).

On the other hand, output from the reading magnetic head 20 is supplied through the low pass filter 27 to the signal detector and pulse generator 33, which detects a positive or negative output from the low-pass filter 27 and generates a positive pulse while said positive or negative output continues to be obtained from said filter 27. Output from said signal detector and pulse generator 33 is conducted to one of the input terminals of the AND circuit 28.

The other input terminal of said AND circuit 28 is supplied with an output pulse from the timing pulse generator 35. Now let it be assumed that the data contents consist of, for example, four bits and there are provided two address bits so as to bridge said four bits. While, under such condition, the motor 12 is driven at high speed, that is, while the designated address is being detected, then said timing pulse generator 35 generates two timing pulses while the four-bit portion of the magnetic tape 13 travels under the reading magnetic head 20. The outputs from the AND circuit 28 is supplied to a coincidence circuit 30 through a register 29.

The address designating signal is fed from the input terminal 31 to a register 36. The temporarily stored signal in the register 36 is then supplied to the other input end of the coincidence circuit 30. The magnetic tape 13 is travelling at high speed at which the coincidence circuit 30 is detecting the designated address by means of the motor 12 which is controlled by an output from a speed control circuit 34. When the designated address is detected, an output is fed from the coincidence circuit 30 to the speed control circuit 34, thereby changing-over the motor 12 to low speed, at which the contents of the designated address is read.

Figure 12:
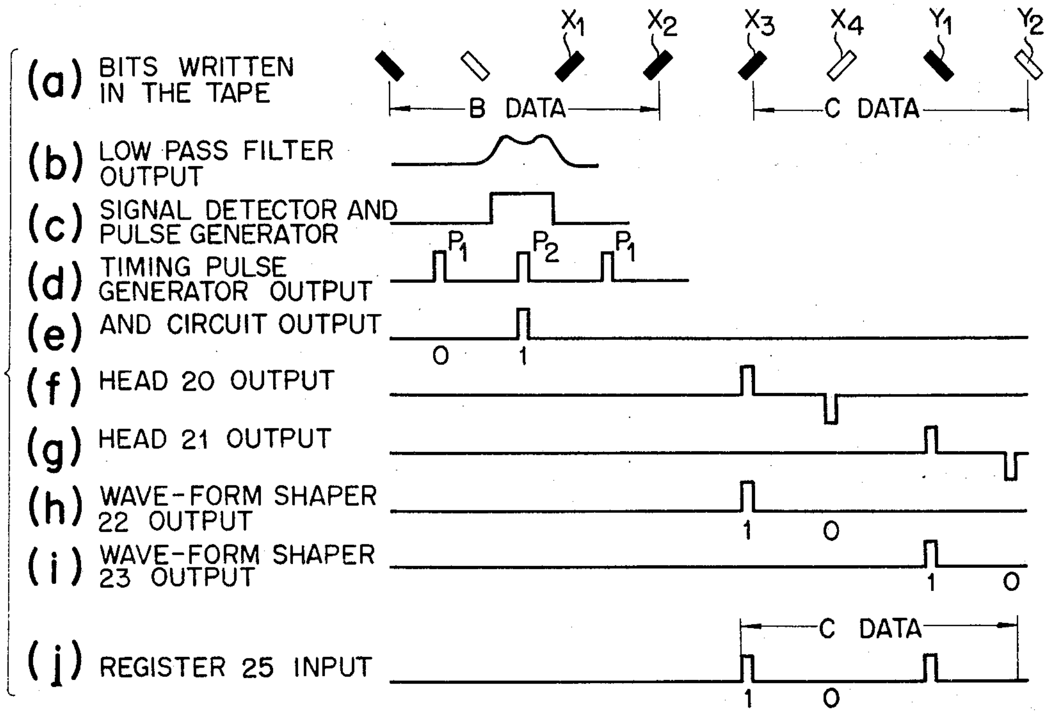
FIG. 12 is a diagram for illustrating the operations of the reading unit shown in FIG. 11.

There will now be described the reading operation by reference to FIGS. 11 and 12. Now let it be assumed that each data has the same contents and addresses as those shown in FIG. 3. Where the address "0 – 1" of the data C is supplied to the address designating terminal 31 so as to read out the contents of said data C, said address "0 – 1" is stored in the register 36. Since at this time the magnetic tape 13 is travelling at high speed, output from the low-pass filter 27 has the wave form shown in FIG. 12(*b*) when the data B represented by the wave form indicated in FIG. 12(*a*) is conducted under the reading magnetic head 20. The reason is that the reading magnetic head 20 detects, as previously mentioned, only bits $X_1$ and $X_2$ and the resultant outputs present the wave form of FIG. 12(*b*) when they are conducted through the low-pass filter 27 in turn. Said output signals are detected by the signal detector and pulse generator 33 which consequently generates a pulse illustrated in FIG. 12(*c*). This pulse is conducted to the AND circuit 28, the other input terminal of which is supplied with a pulse shown in FIG. 11(*d*) from the timing pulse generator 35. Where, as previously described, the data contents consist of four bits and the address has two bits, the last mentioned pulse (FIG. 11(*d*) generates two pulses $P_1$ and $P_2$ during a period corresponding to the four bit portion of the magnetic tape 13. As the result, output from the AND circuit 28 presents the wave form "0 – 1" indicated in FIG. 12(*e*). This wave form "0 – 1" is stored in the register 29. The coincidence circuit 30 previously stored with the designated address "0 – 1" supplies an output proving said coincidence to the speed control circuit 34. Said coincidence output is further conducted to the gates 40 and 41 so as to slow down the rotation of the motor 12 and in consequence the travel of the magnetic tape 13, with the result that the gates 40 and 41 are opened. Of the contents "1" $X_3$, "0" $X_4$, "1" $Y_1$ and "0" $Y_2$, the bits $X_3$ and $X_4$ are picked up by the reading magnetic head 20 and the bits $Y_1$ and $Y_2$ by the reading magnetic head 21 (outputs from these heads have the wave forms shown in FIGS. 12(*f*) and 12(*g*) respectively). Said outputs are further conducted through the gates 40 and 41 to the wave-form shapers 22 and 23, which, as previously mentioned, check whether the pulse supplied is positive or negative, and respectively generate pulses indicated in FIGS. 12(*h*) and 12(*i*), said pulses being further supplied through the OR circuit 24 to the register 25. As the result, the register 25 is stored with a pulse shaped as in FIG. 12(j). The data contents "1 – 0 – 1 – 0" are decoded by, for example, the decoder 26 and indicated by a display device.

Figures 13, 14:
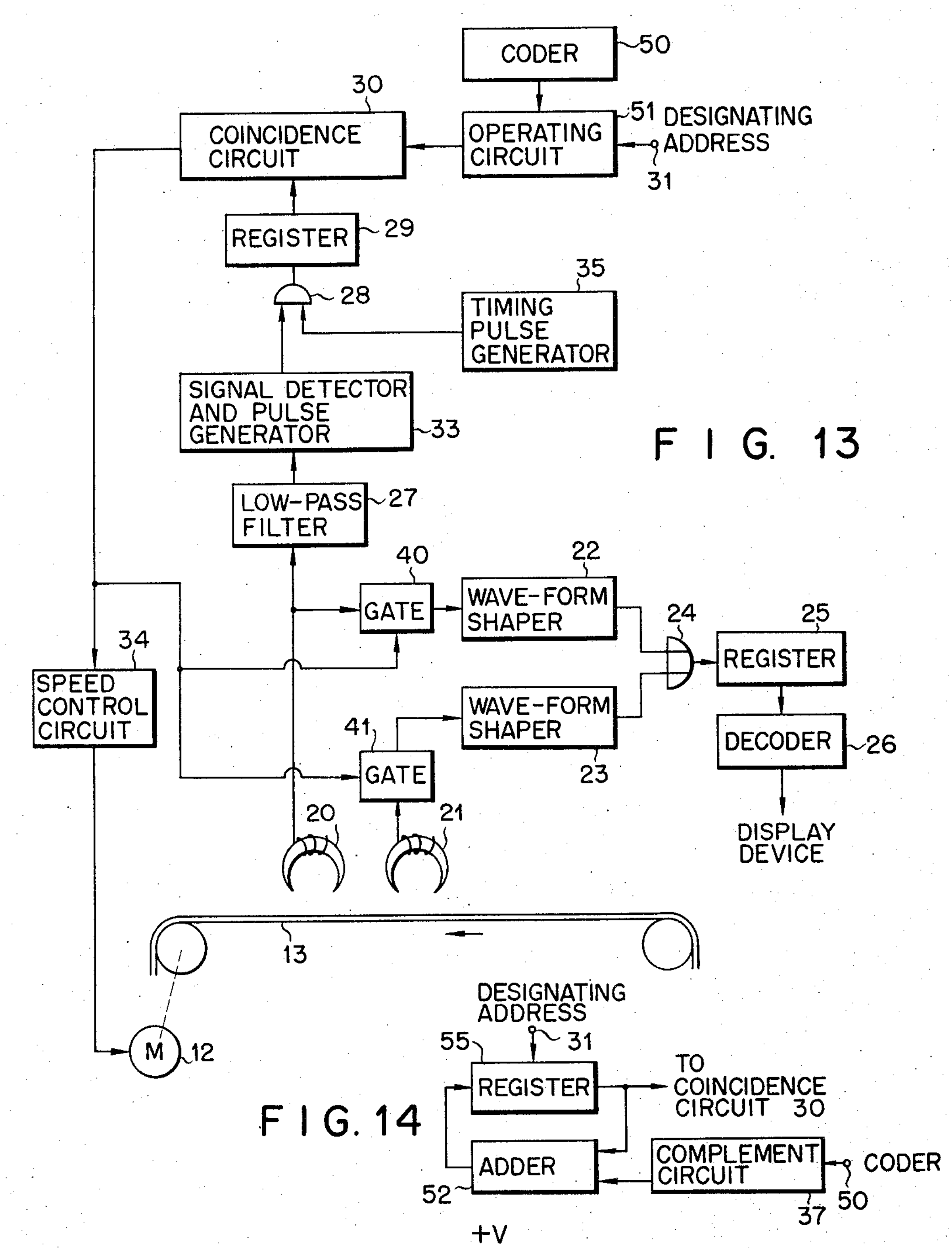
FIG. 13 is a diagram of circuit arrangement showing another embodiment of the reading unit according to this invention.
FIG. 14 is a diagram of circuit arrangement showing an embodiment of an operating circuit in FIG. 11.

As mentioned above, the foregoing embodiment of this invention is so designed that where it is desired to read out the required data contents, this object is attained by reading out the address of said required data which is attached to the immediately preceding data contents and upon completion of said reading, the drive of the magnetic tape 13 is slowed down so as to pick up said required data contents. Since, however, the feeding mechanism of the magnetic tape 13 has inertia, the predetermined low speed is not immediately realized by the change-over from the high speed to the low speed, and the tape 13 disadvantageously travels excessively. FIG. 13 presents another embodiment wherein the aforesaid disadvantages are eliminated. According to this embodiment, when there is designated a desired address, there is generated an address bit representing the address immediately preceding said desired address, thereby compensating the excess travel of the magnetic tape 13 which might arise when the rotation of the motor 12 is slowed down, by obtaining an address data immediately preceding that of said desired address through said operating circuit 32. For example, when the contents of the data C are to be read out as shown in FIG. 3, the designated address bits "1" – "0" are supplied to the address designating input terminal 31. These address bits of "1" – "0" are converted by the operating circuit 51 to the address bits "1" – "1" associated with the data A. When said address bits "1" – "1" of the data A written in the tape 13 are read out by the reading head 20, the motor 12 is slowed down by an output from the coincidence circuit 30. The transitional period required for the motor 12 to attain said low speed is compensated by determining in the aforementioned manner that portion of the tape 13 where the data B is recorded. Accordingly, the contents of the data C can be correctly read from its foremost bit at a low speed. Where the data contents have, as shown in FIG. 10, a larger number than the address bits, the aforesaid transitional period required for the changeover of the motor speed can of course be compensated by providing an address at the foremost part of the data, thereby enabling the desired data II to be read out immediately upon the completion of said slowdown. If, in such case, the circuits shown in FIGS. 1 and 11 are used, then there can be obtained the same advantage as realized when data and addresses are arranged as illustrated in FIG. 6.

The operating circuit 51 is arranged by way of example as illustrated in FIG. 14. More specifically, the address designating signal from the terminal 31 is applied to one of the input terminals of an adder 52 from a register 55, the complement of the constant output from the coder 50 is applied to the other input terminal of the adder 52 through a complement circuit 37, and the addition output in the adder 52, i.e., the address designating signal provided by subtracting the constant from the address designating signal, is fed to the coincidence circuit 30 from the register 55.

Figure 15:
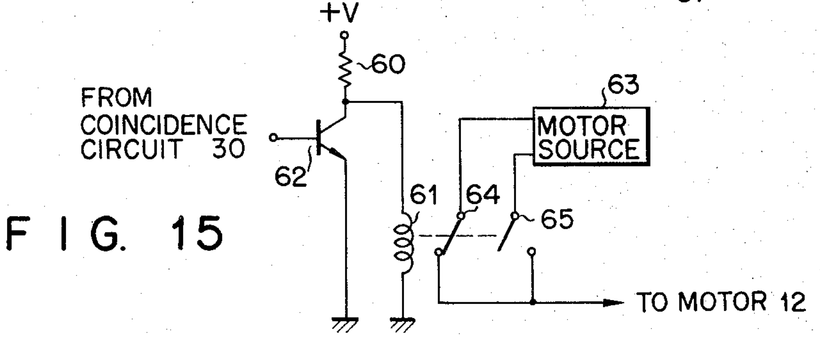
FIG. 15 is a diagram of circuit arrangement showing an embodiment of a circuit in FIG. 11 for controlling the travelling speed of the magnetic tape.

The speed control circuit 34 is arranged by way of example as illustrated in FIG. 15. More specifically, a transistor 62 having the output of the coincidence circuit 30 supplied to its base is connected in parallel with a relay coil 61 which is connected in series with a resistor 60 between a power source +V and the earth. Thus, the connection between a high-speed terminal 64 or a low-speed terminal 65 of a motor power source 63 and the motor 12 may be changed-over by means of the relay coil 61. When there is no base input from the coincidence circuit 30, the transistor 62 is in the OFF state. The relay coil 61 is therefore energized to connect the motor 12 to the high-speed terminal 64 of the power source 63, so that the motor 12 is rotated at the high speed. When there is the base input, the transistor 62 is brought into the ON state. As a result, the relay coil 61 is deenergized, the terminal 65 is connected to the motor source 63, and the motor 12 is changed-over so as to rotate at the low speed. Thus, the information stored on the magnetic tape 13 are read by the heads 20 and 21. The data are supplied to, e.g., the display device in the manner previously described.

According to this invention, it is also possible to use heads 10 and 11 as reading heads 20 and 21 shown in FIG. 13.

What we claim is:

1. Magnetic tape memory apparatus composed of a writing unit and a reading unit; said writing unit comprising a magnetic tape feeding device, first and second writing magnetic heads which are juxtaposed along the travelling direction of a magnetic tape so that the directions of magnetization thereof may intersect each other, and a change over logical circuit which feeds data to said first writing magnetic head when the bit level of an address is "1" and to said second writing magnetic head when it is "0" and which thereby stores them on said magnetic head; said reading unit comprising first and second reading magnetic heads which individually read the information stored on said magnetic tape, means to combine outputs from said first and second reading magnetic heads to thereby reproduce said data, and means to compare an output from said first magnetic head of said reading unit and an information representative of a designated address in order to lower the travelling speed of said magnetic tape when said output and said information coincide.

2. Magnetic tape memory apparatus according to claim 1, wherein said first and second writing magnetic heads and said first and second reading magnetic heads are respectively arranged so that the directions of magnetization thereof may intersect substantially at right angles each to other.

3. Magnetic tape memory apparatus according to claim 1, wherein said writing unit comprises a first shift register to which said data are supplied, a second shift register to which the address signal is supplied, a clock generator for feeding clock pulses to said first and second shift registers, a first gate to which the outputs of said first and second shift registers are supplied, an inverter which inverts the output of said second shift register, a second gate to which the output of said inverter and that of said first shift register are supplied, and means to control the magnetizing current which is supplied from said first and second gates to said first and second writing magnetic heads, respectively.

4. Magnetic tape memory apparatus according to claim 3, further comprising a frequency divider which divides the frequency of the output of said clock generator at a predetermined ratio to expand its pulse width, thereby to supply the divided frequency signal to said second shift register.

5. Magnetic tape memory apparatus according to claim 1, wherein said reading unit comprises first and second wave-form shapers to which outputs from said first and second reading magnetic heads are respectively supplied, an OR circuit to which the outputs of said first and second wave-form shapers are supplied, a buffer register which stores the output of said OR circuit, a low pass filter to which the output of said first reading magnetic head is supplied, means to reproduce the address signal from the output of said low-pass filter, a third register storing an address signal corresponding to desired data, a coincidence circuit which compares the output of said reproducing means and that of said third register, and a speed control circuit which controls said magnetic tape so as to feed at high speed when there is no coincidence output from said coincidence circuit and to feed at low speed when said coincidence output is occured.

6. Magnetic tape memory apparatus according to claim 1, wherein said reading unit comprises first and second wave-form shapers to which outputs from said first and second reading magnetic heads are respectively supplied, an OR circuit to which the outputs of said first and second wave-form shapers are supplied, a buffer register which stores the output of said OR circuit, a low-pass filter to which the output of said first reading magnetic head is supplied, means to reproduce the address signal from the output of said low-pass filter, an operating circuit which provides the precedent address signal preceding by predetermined number of bits to the address signal corresponding to desired data, a coincidence circuit which compares the output of said reproducing means and that of said operating circuit, and a speed control circuit which controls said magnetic tape so as to feed at high speed when there is no coincidence output from said coincidence circuit and to feed at low speed when said coincidence output occurs.

7. Magnetic tape memory apparatus according to claim 5, wherein said speed control circuit comprises a relay coil which is connected between the positive terminal of a relay power source and the earth, a transistor which is connected between the positive terminal of said relay coil and the earth and which has the output of said coincidence circuit supplied to its base, and a contact arrangement which is closed upon energization of said relay coil, to couple a high speed feeding terminal of a power source for feeding said magnetic tape and a motor for feeding said magnetic tape, and which effects change-over to a low speed feeding terminal of said power source upon deenergization of said relay coil.

8. Magnetic tape memory apparatus according to claim 5, wherein said operating circuit comprises a complement circuit which produces the complement of said address signal, a constant register which stores a constant of a predetermined number of bits, an adder which adds the output of said constant register and that of said complement circuit thereby to feed the added output to said constant register, and means to apply the output of said constant register to said coincidence circuit.

* * * * *